US008589671B2

(12) United States Patent
Schneider (10) Patent No.: US 8,589,671 B2
(45) Date of Patent: Nov. 19, 2013

(54) SECURITY IMPLEMENTATION WITHIN A BROWSER

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 726 days.

(21) Appl. No.: 12/394,574

(22) Filed: Feb. 27, 2009

(65) Prior Publication Data

US 2010/0223456 A1 Sep. 2, 2010

(51) Int. Cl.
*H04L 29/06* (2006.01)
(52) U.S. Cl.
USPC .......................................... 713/152; 380/277
(58) Field of Classification Search
USPC .............. 726/9, 26, 27, 28, 29; 713/224, 201, 713/212, 213, 220, 223; 709/204, 201, 220, 709/227; 707/600, 607, 608, 609, 687, 821; 380/200, 201, 202, 293, 227
See application file for complete search history.

(56) References Cited

U.S. PATENT DOCUMENTS

| 2005/0108517 A1* | 5/2005 | Dillon et al. ................... 713/150 |
| 2010/0115613 A1* | 5/2010 | Ramaswami et al. ............ 726/22 |
| 2010/0185862 A1* | 7/2010 | Moore et al. ................... 713/171 |

OTHER PUBLICATIONS

Herley, Cormac et al., "How to Login From an Internet Café Without Worrying About Keyloggers," Symposium on Usable Privacy and Security, SOUPS '06, Jul. 2006, 2 pages.
Florencio, Dinei et al., "KLASSP: Entering Passwords on a Spyware Infected Machine Using a Shared-Secret Proxy," Computer Security Applications Conference, 2006, ACSAC '06, 22$^{nd}$ Annual, Dec. 2006, pp. 67-76.

\* cited by examiner

*Primary Examiner* — Jeffrey Pwu
*Assistant Examiner* — Nega Woldemariam
(74) *Attorney, Agent, or Firm* — Lowenstein Sandler LLP (57) ABSTRACT

Techniques for implementing security within a browser of a data processing system are described herein. According to one embodiment, first data representing a user interaction with a Web page presented by a browser application is encrypted at an application level by a cipher module communicatively coupled to the browser application running at a local client. A JavaScript module embedded within the browser application is configured to transmit the encrypted first data over a network to a remote server for updating the Web page. In response to second data received from the remote server, the cipher module is configured to decrypt the second data at the application level and the decrypted second data is then rendered by the browser application to update the Web page without having to reload the entire Web page. Other methods and apparatuses are also described.

21 Claims, 6 Drawing Sheets

SECURITY IMPLEMENTATION WITHIN A BROWSER

TECHNICAL FIELD

The present invention relates generally to a secure communication system. More particularly, this invention relates to implementing security within a browser of a data processing system.

BACKGROUND

As the Internet and its underlying technologies have become increasingly familiar, attention has become focused on Internet security and computer network security in general. With unprecedented access to information has also come unprecedented opportunities to gain unauthorized access to data, change data, destroy data, make unauthorized use of computer resources, interfere with the intended use of computer resources, etc. These opportunities have been exploited time and time again by many types of malware including, but is not limited to computer viruses, worms, Trojan horses, etc.

Recently, some new types of software have emerged, collectively called "spyware." Spyware, while not as malicious as the aforementioned conventional viruses, Trojan horses, etc., may still cause problems for computer users. For example, spyware may be designed to log keystrokes, track which websites a computer user visits, and/or transmit personal information to a third party.

Keyloggers are not the only security threat faced by reliance on suspect hardware. It is fairly easy to install virtually undetectable traffic sniffers that catch a snapshot of all of the network traffic that goes through a particular browser of a computer. This can be made to operate as a plug-in for a browser, such that it could even see certain types of secure traffic such as SSL/TLS (secure socket layer/transport layer security) traffic in a plain text form.

BRIEF DESCRIPTION OF THE DRAWINGS

The present invention is illustrated by way of example and not limitation in the figures of the accompanying drawings in which like references indicate similar elements.

DETAILED DESCRIPTION

Techniques for implementing security within a browser of a data processing system are described herein. In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Accordingly, an embodiment of the invention is to use asynchronous HTTP (hypertext transport protocol) request processing within or closely coupled to a browser, under the direction of a JavaScript, to send and receive pages between a client machine and a server over a network. A key feature here is to encipher contents within the browser (e.g., at an application level), such that nothing can be seen by a traffic sniffer to reveal anything other than host names and cookie values.

From a user perspective, they would go to a page that was protected using this technology, and be presented with a page that asks for username and password/passphrase credentials. This can be in the form of a virtual on-screen keyboard, or more traditional input elements. The results of this solicitation are used in a proof-of-knowledge protocol for the username and password (run by a JavaScript across an asynchronous HTTP request object). The script and the server jointly negotiate or derive a key. This key is stored in the script as a variable (e.g., a volatile memory location specifically allocated for the script other than a cookie) and is used to encrypt further traffic at an application level. Once the negotiation is complete, the script would communicate with the server, redrawing page elements as necessary, based on the encrypted commands from the server.

In addition, according to an alternative embodiment, the server may be implemented as a proxy server, such as, for example, a pay service where traffic is routed through the proxy and secured. This particular scheme is secure enough to defeat currently extant traffic sniffers, but if it is deployed in any numbers, or if a service like this were to become popular, it would eventually fall to programs that examine the memory of the browser for the page that will be displayed. However, instead of displaying text directly, the script could load a cache of images, where each image was a word, a character, a short string of characters, or even fragments of characters. For example, the images could be composed onscreen to present the page as it would otherwise be rendered (e.g., if it were being rendered by the browser).

Figure 1:
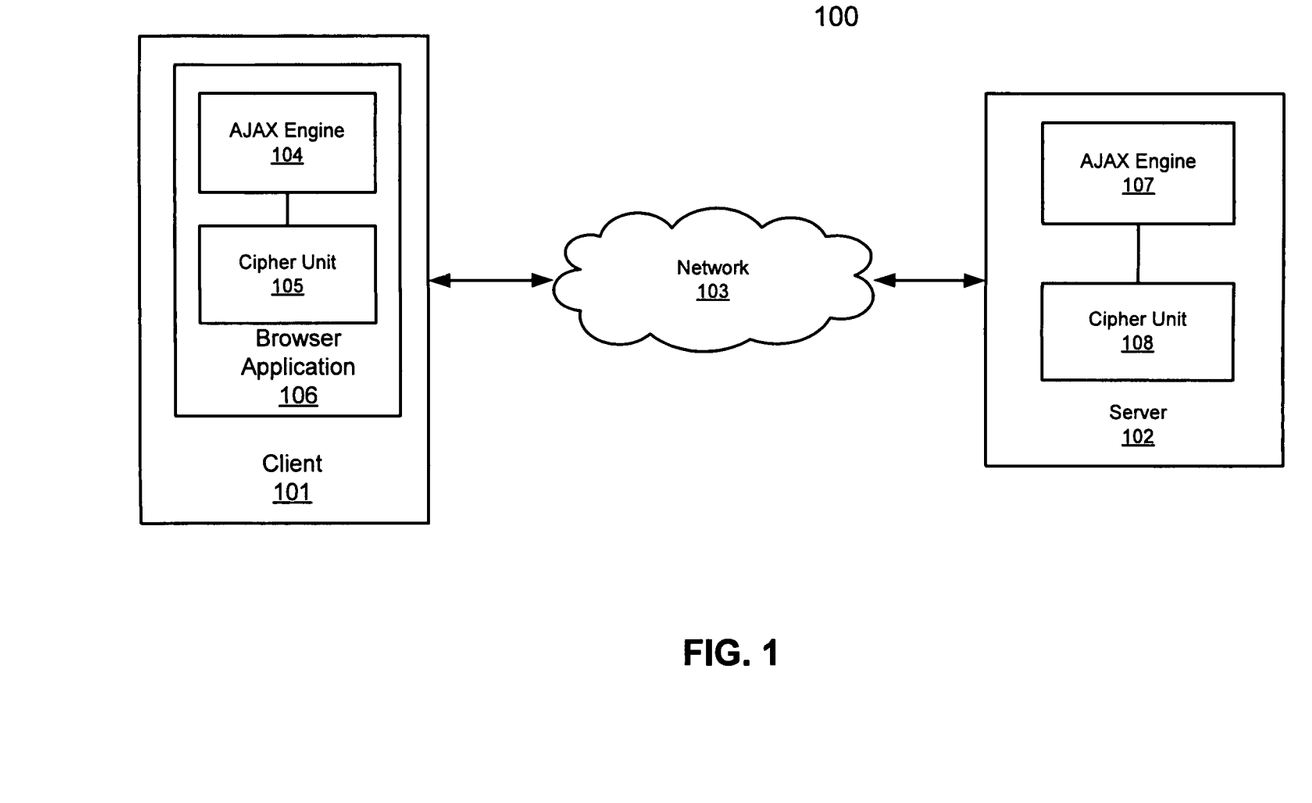
FIG. 1 is a block diagram illustrating an example of a network configuration according to one embodiment of the invention.

FIG. 1 is a block diagram illustrating an example of a network configuration according to one embodiment of the invention. Referring to FIG. 1, according to one embodiment, network configuration 100 includes a client 101 communicatively coupled to a server 102 over a network 103. Client 101 may be any kind of client machines such as a personal computer (PC) either as a desktop or a portable computer. For example, client 101 may be a computer available in a public domain, such as those available in a public library or a cyber café, etc. In these environments, it is very common that a spyware such as a traffic sniffer may be installed in the system. Web server 102 may be any Web server that provides content or services to users. For example, Web server 102 may be a part of a Web site of a financial institute. Network 103 may be a wide area network (WAN) such as the Internet, a local area network (LAN), or a combination of both.

A variety of applications can be running within client 101, such as, for example, a browser application 106, which may be an Internet Explorer™ from Microsoft Corporation of Redmond, Wash. Browsers are but one example of a Web application based on a document object model that enables a user to display and interact with text, images, and other information at a Web site on the World Wide Web or a local area network. This document object model functions as an interface for accessing the arbitrary elements of an XML (extensible markup language) document and follows a stateless communication scheme where a request by a client is followed by a response from the server.

Recently, Web applications, know as rich Internet applications (RIA), have become popular because they provide the features and functionality of traditional desktop applications. RIAs also eliminate the need to click through to another page to see related information. With a rich user interface (rich UIs), it is possible to send only the changed information rather than the entire document. Documents with the rich UI increase bandwidth utilization resulting in less network congestion and faster, more efficient access to relevant information for the user.

Asynchronous JavaScript and XML or more simply, AJAX, is a bundle of technology for developing and delivering the rich UI over the Internet that has become increasingly popular. Specifically, AJAX is a client side technology that enables a UI event to propagate to the server at a more granular level compared to the document data model.

Referring back to FIG. 1, within the browser application 106, an asynchronous communications module 104, in this example, an AJAX engine, is implemented to asynchronously communicate with a remote server 102. AJAX engine 104 is also referred to as a client AJAX engine or a client AJAX controller. AJAX engine 104 is JavaScript code that is installed on browser application 106 of the client 101 and is made available to an application running on the client 101. The AJAX engine 104 is configured to manage the events, poll server 102 for notifications periodically and load the data retrieved from the server 102 on the client 101 asynchronously. The loaded data is rendered on the client 101 dynamically without having to re-load the entire content.

Similarly, server 102 is equipped with an AJAX engine or controller 107. The AJAX controller 107, also referred to as a server controller, is capable of interacting with other runtime scripts on the server 102 and with the client AJAX controller 104. The server AJAX controller 107 may be implemented using JAVA Servlet code, or any other technology so long as it is capable of interacting with other runtime scripts on the server 102 and with the client AJAX controller 104. The server AJAX controller 107 manages requests received from the client 101 and forwards them to appropriate runtime scripts running on the server 102 for further processing. The server AJAX controller 107 is configured to manage the events on the server 102 and to return data associated with the events to the client controller 101 asynchronously in response to requests or upon poll originating from the client 101.

In addition, according to one embodiment, a security module 105, in this example, a cipher unit, is implemented within or communicatively coupled (e.g., a plug-in application) to browser application 106. The cipher unit 105 is configured to encrypt data objects to be transmitted by the AJAX engine 104 to server 102. Similarly, when the AJAX engine 104 receives a data object from a corresponding server AJAX engine 107 of server 102, which has been encrypted by cipher unit 108 of server 102, the cipher unit 105 is configured to decrypt the received data object prior to be presented to a user by AJAX engine 104.

For example, when a user clicks a content item of a Web page, typically, an asynchronous request is generated by AJAX engine 104 and transmitted to server 102. According to one embodiment, prior to generating an asynchronous request such as an XMLHTTPRequest object, data that is supposed to be embedded within the request is encrypted by cipher unit 105. Thereafter, the asynchronous request having the encrypted data therein is sent to server 102 to be handled by server AJAX engine 107 and decrypted by cipher unit 108 of server 102.

Similarly, when AJAX engine 104 of client 101 receives a response from AJAX engine 107 and encrypted by cipher unit 108 of server 102, cipher unit 105 is invoked to decrypt the corresponding data object prior to rendering the data object and presenting it to the user of client 101. As a result, even if client machine 101 has been infected with a traffic sniffer, which typically sniffs traffic between an application such as browser 106 and a network stack (not shown) of client 101, the traffic sniffer cannot intercept and see the content in a plain text format. That is, since the data to be communicated with client 101 and server 102 has been encrypted at an application level, a traffic sniffer is not able to see the data in plain text. At most, the traffic sniffer can only intercept the encrypted version of the data and is not able to decrypt it without the necessary encryption information.

According to one embodiment, when a browser application 106 initiates a connection with server 102, either AJAX engine 104 or cipher unit 105 may negotiate a key with the corresponding counterpart AJAX engine 107 or cipher unit 108 for a corresponding communication session. The key may be stored in a volatile memory location such that when the communication session ends, the key will be destroyed. It is important note that the key should not be stored in a cookie that is easily obtained by others.

Note that throughout this application, an AJAX engine is used as an example of an asynchronous communications module running at an application level. However, it is not so limited; other types of asynchronous communications module may also be implemented. Also note that a request having the encrypted data therein for updating a Web page may be synchronously or asynchronously transmitted between a client and a server. An asynchronous request is one where the request is issued, but the requester does not wait for the response. Instead, the response is handled by a callback function.

Figure 2:
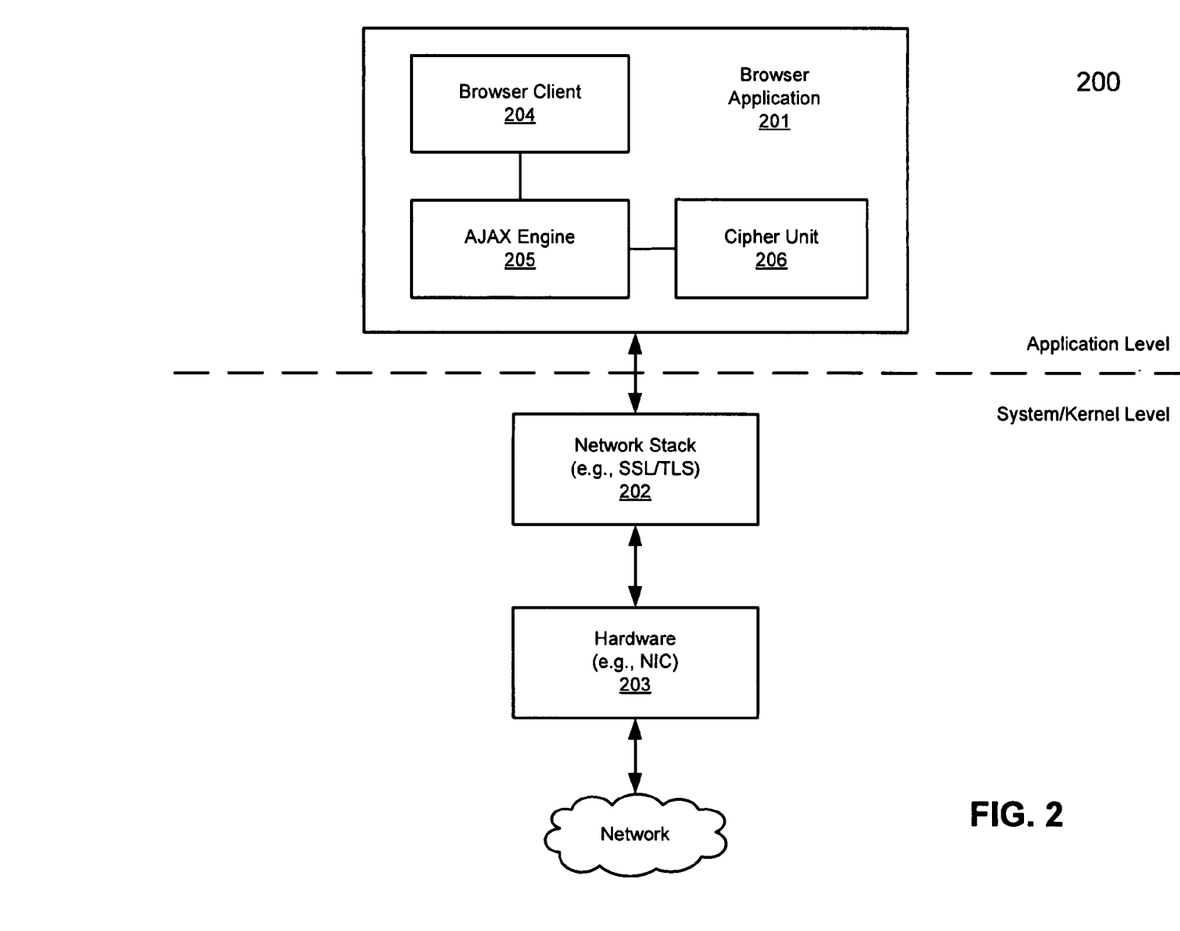
FIG. 2 is a block diagram illustrating an example of architecture of a client according to one embodiment of the invention.

FIG. 2 is a block diagram illustrating an example of architecture of a client according to one embodiment of the invention. For example, system 200 may be implemented as part of client 101 of FIG. 1. Referring to FIG. 2, system 200 includes a browser application 201 running at an application level communicatively coupled to a network stack 202 running in at a system or kernel level of system 200. Typically, browser application 201 exchanges data with network stack 202 which packages the data into network packets according to a variety of network protocols such as TCP/IP protocols. The network packets are then exchanged with a remote system over a network.

According to one embodiment, browser application 201 includes a browser client 204 configured to render content of a Web page to be presented to a user. Browser application 201 further includes an AJAX engine 205 configured to communicate with a remote system in response to a user interaction with the Web page. As described above, AJAX engine 205 is configured to provide updates of a portion of the Web page without having to reload the entire Web page at system 200. In addition, a cipher unit 206 is embedded within browser application 201 or alternatively, as a plug-in application communicatively coupled to browser application 201 at an application level. The cipher unit 206 is configured to encrypt and/or decrypt data exchanged between AJAX engine 205 and a remote counterpart (not shown) as described above.

Typically, data exchanged between a local machine and a remote machine may be encrypted within network stack 202, for example, using the SSL/TLS protocols. However, data exchanged between an application and the network stack is not encrypted. Thus, if a traffic sniffer is installed within system 200, the traffic sniffer normally sniffs the traffic between browser application 201 and network stack 202. Since the encryption and/or decryption is performed by cipher unit 206 at the application level according to one embodiment, a traffic sniffer cannot sniff the traffic generated from browser application 201. For example, when a user logs into a Web page by typing certain confidential information such as a username and/or password, the entered information is encrypted by cipher unit 206 prior to be transmitted to network stack 202 by AJAX engine 205. As a result, a traffic sniffer that normally sniffs between browser application 201 and network stack 202 is not able to recover the confidential information in a plain text form. At most, the traffic sniffer can only see the confidential information in an encrypted form and cannot decrypt it without a proper key. Note that some or all of the components as shown in FIG. 2 may be implemented in software, hardware, or a combination of both.

Figure 3:
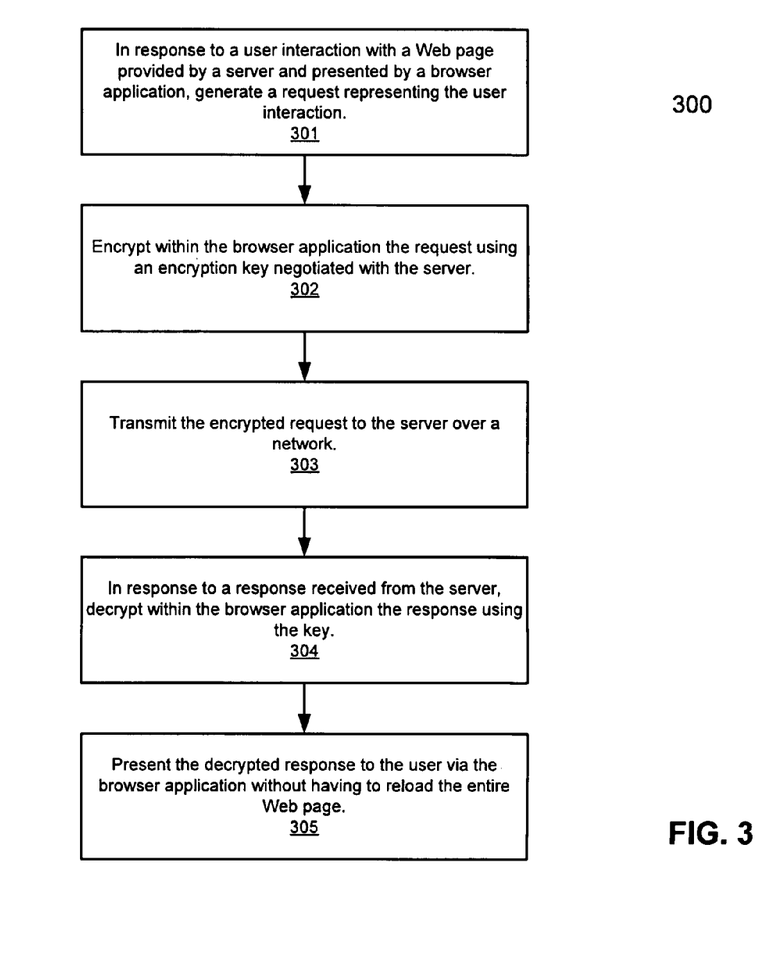
FIG. 3 is a flow diagram illustrating a method for encrypting data within a browser application according to one embodiment of the invention.

FIG. 3 is a flow diagram illustrating a method for encrypting data within a browser application according to one embodiment of the invention. Note that method 300 may be performed by processing logic which may include software, hardware, or a combination of both. For example, method 300 may be performed by system 200 of FIG. 2. Referring to FIG. 3, in response to a user interaction with a Web page provided by a remote Web server, at block 301, a browser application generates a request representing the user interaction. At block 302, the request is encrypted at an application level (e.g., either within the browser application or another application closely coupled to the browser application. In one embodiment, the request is encrypted using a key negotiated between the browser application and a remote server, particularly, associated with a current communication session. At block 303, the encrypted request is transmitted, for example, via an AJAX mechanism, to a remote server over a network. In response to a response received from the remote server, at block 304, the response is decrypted at the application level and is rendered and presented to the user at block 305. Other operations may also be performed.

As described above, an AJAX engine of a client can negotiate with a corresponding counterpart of a server to obtain a key for secure communications at least for a corresponding communication session. However, such an implementation requires both client and server to agree upon a specific secure communication form, such as an encryption method, etc. Thus, if a client wishes to have the above secure techniques to access multiple Web sites, all of the those Web sites have to implement in a similar way. This requirement sometimes may not be feasible in some of the Web sites. Accordingly, according to one embodiment, the above techniques may be implemented in a proxy server as a centralized manner.

Figure 4:
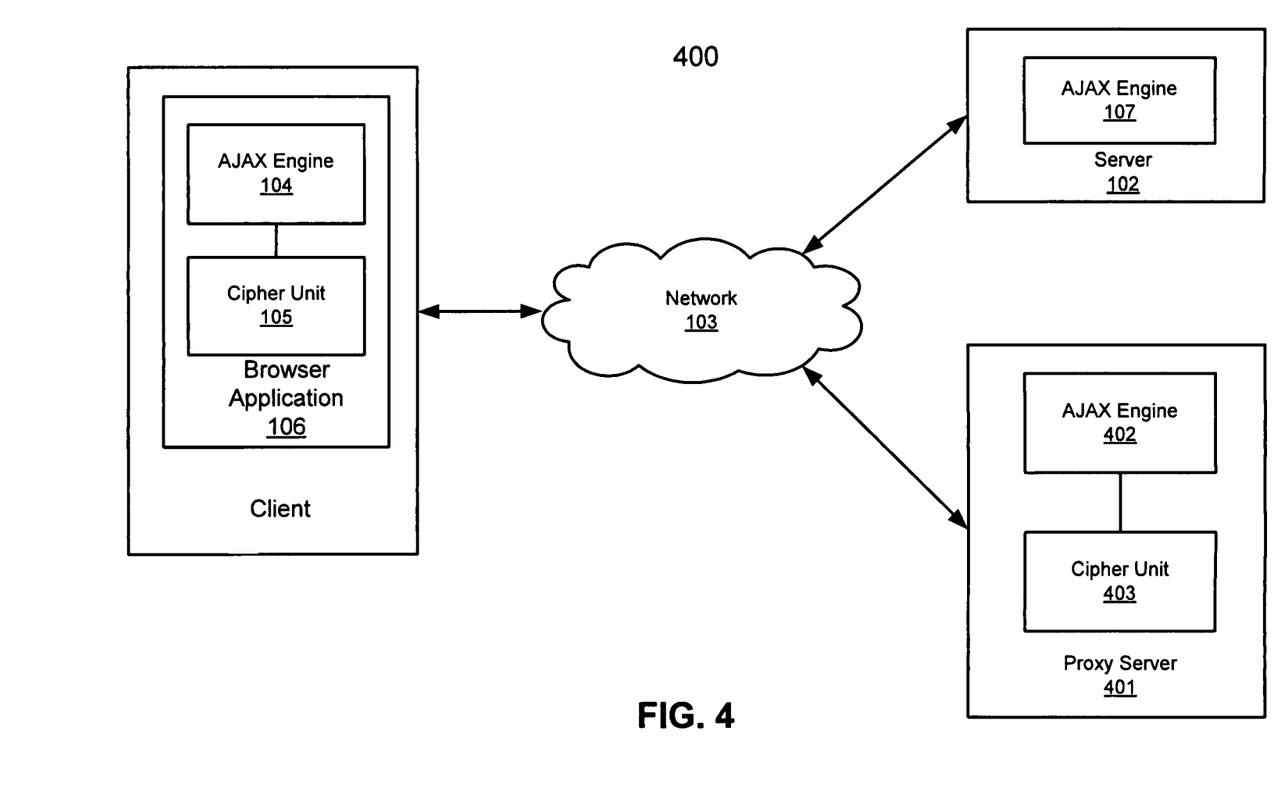
FIG. 4 is a block diagram illustrating an example of a network configuration according to another embodiment of the invention.

FIG. 4 is a block diagram illustrating an example of a network configuration according to another embodiment of the invention. Similar to the configuration as shown in FIG. 1, network configuration 400 includes a client 101 having a browser application 106 running therein. Within the browser application 106, an AJAX engine 104 is configured to communicate with a remote server to update changes of a Web page presented to a user without having a reload the entire Web page. In addition, a cipher unit 105 is communicatively coupled to the AJAX engine 104 and is configured to encrypt data to be transmitted by the AJAX engine 104.

Unlike the configuration as shown in FIG. 1, the AJAX engine 104 is configured to communicate with an AJAX counterpart, AJAX engine 402 of a proxy server 401. Similarly, a cipher counterpart, cipher unit 403 is running within the proxy server 401 and configured to encrypt and decrypt traffic exchanged between client 101 and proxy server 401. Thus, data exchanged between client 101 and proxy server 401 is encrypted using a key negotiated between AJAX engines 104 and 402, or alternatively between cipher units 105 and 403, where the data is encrypted and decrypted at an application level.

According to one embodiment, AJAX engine 402 is configured to serve as a proxy between client 101 and server 102. For example, when AJAX engine 402 receives a request from AJAX engine 104 that is encrypted by cipher unit 105, AJAX engine 402, serving as a server AJAX counterpart, invokes cipher unit 403 to decrypt the data. In turn, AJAX engine 402 repackages the data and transmits the data to a destination server 102 and handled by a counterpart AJAX engine 107. In this situation, AJAX engine 402 operates as a client to server 102.

Note that although data exchanged between client 101 and proxy server 401 is encrypted at an application level; however, data exchanged between proxy server 401 and server 102 is not encrypted. It is assumed that a traffic sniffer is normally installed at client 101 instead of proxy server 401, wherein client 101 may be a computer publically available, for example, in a public library or cyber café, etc. In this embodiment, client 101 can use proxy server 401 to access multiple remote servers without requiring such servers to implement the application level secure mechanism set forth above. Note that some or all of the components as shown in FIG. 4 may be implemented in software, hardware, or a combination of both.

Figure 5:
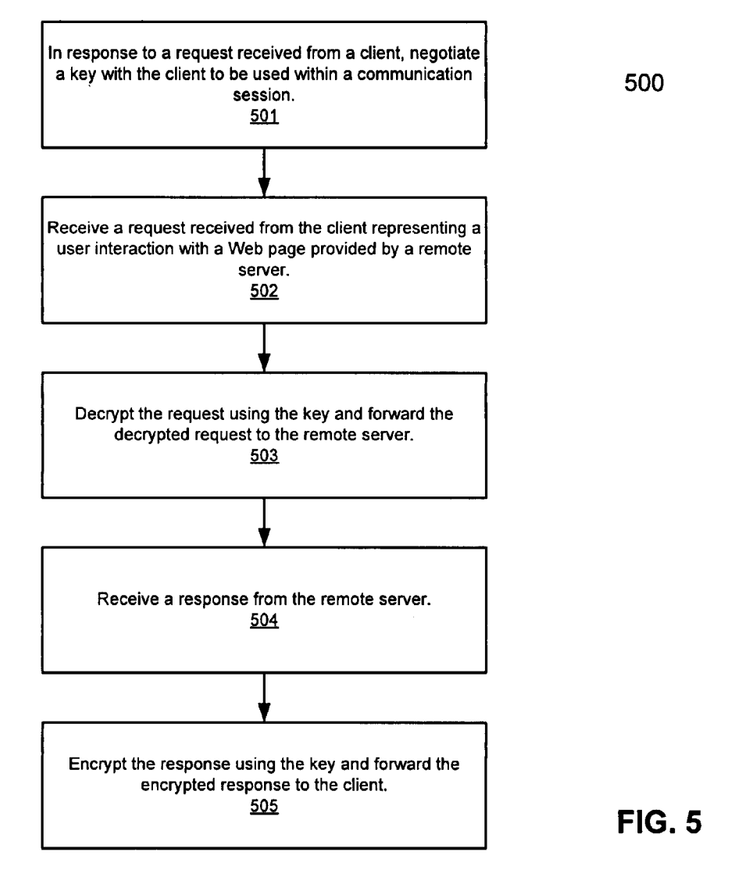
FIG. 5 is a flow diagram illustrating a method for encrypting data within a browser application according to another embodiment of the invention.

FIG. 5 is a flow diagram illustrating a method for encrypting data within a browser application according to another embodiment of the invention. Note that method 500 may be performed by processing logic which may include software, hardware, or a combination of both. For example, method 500 may be performed by system 400 of FIG. 4. Referring to FIG. 5, in response to a request received from a client, at block 501, a proxy server negotiates a key with the client to be used within a communication session. Subsequently, at block 502, the proxy server receives a request transmitted from the client representing a user interaction with a Web page provided by a remote server. At block 503, the proxy server decrypts data of the request, for example, at an application level, using the key and forwards the decrypted request to the remote server. At block 504, the proxy server receives a response from the remote server. In response, at block 505, the proxy server encrypts the response and forwards the encrypted response back to the client. Other operations may also be performed.

Figure 6:
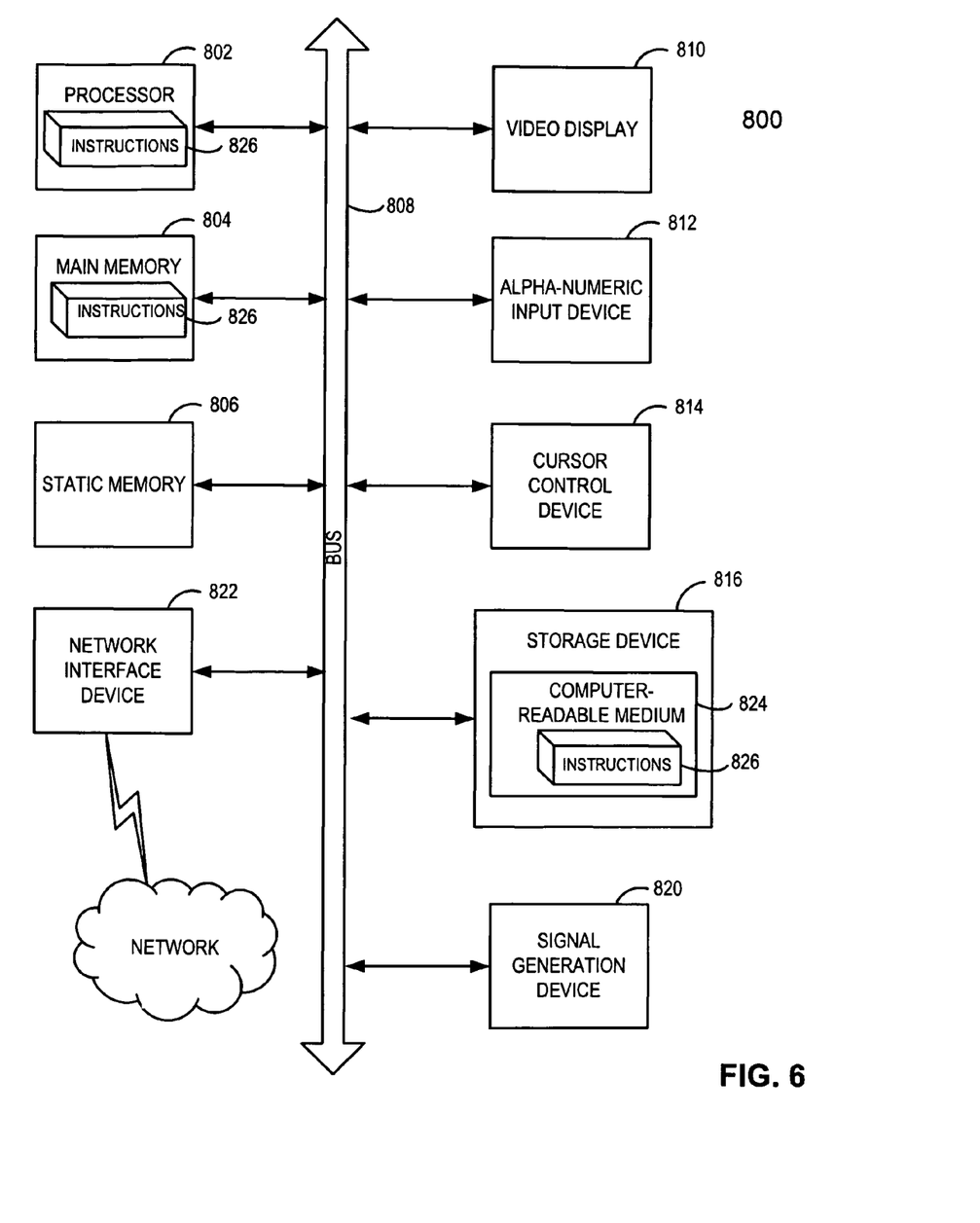
FIG. 6 is a block diagram illustrating a machine which may be used with an embodiment of the invention.

FIG. 6 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. For example, machine 800 may be implemented as part of a client, a server, and/or a proxy as described above.

Machine 800 may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 816, which communicate with each other via a bus 808.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute the instructions 826 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software 826 embodying any one or more of the methodologies or functions described herein. The software 826 may also reside, completely or at least partially, within the main memory 804 and/or within the processing device 802 during execution thereof by the computer system 800, the main memory 804 and the processing device 802 also constituting machine-accessible storage media. The software 826 may further be transmitted or received over a network via the network interface device 822.

Thus, techniques for implementing security within a browser of a data processing system have been described herein. Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A computer-implemented method, comprising:
   encrypting first data representing a user interaction with a Web page presented by a browser application, the first data being encrypted at an application level by a cipher module communicatively coupled to the browser application running at a local client machine;
   causing, by a JavaScript module embedded within the browser application, the encrypted first data to be transmitted to a remote server for updating the Web page;

receiving, by the JavaScript module, second data from the remote server representing an update of the Web page in response to the first data;

decrypting the second data by the cipher module at the application level of the local client, wherein at least a portion of the second data is decrypted into a text string;

selecting, by the cipher module, a plurality of images from an image cache based on the text string, wherein each selected image is representative of a portion of the text string;

arranging, by the cipher module, the one or more images into an image composition that resembles the text string; and updating the Web page based on the image composition without reloading an entirety of the Web page and without the browser application rendering the text string.

2. The method of claim 1, wherein the JavaScript module is an AJAX (asynchronous JavaScript XML) module, and wherein the encrypted first data is asynchronously transmitted to the remote server via an XMLHTTPRequest compatible request.

3. The method of claim 1 wherein the first data is decrypted by a corresponding JavaScript module running within the remote server, and wherein the second data is encrypted by the corresponding JavaScript module of the remote server.

4. The method of claim 3, wherein the first data and second data are encrypted and decrypted using a key negotiated between the JavaScript module and the corresponding JavaScript module of the remote server, and wherein the key is stored at a location of a volatile memory other than a cookie associated with the browser application.

5. The method of claim 3, wherein the remote server is a proxy server, wherein in response to the encrypted first data received from the local client, the proxy server is configured to decrypt the first data and to transmit the decrypted first data to a destination Web server that hosts the Web page.

6. The method of claim 5, wherein, in response to the second data from the destination Web server in response to the first data, the proxy server is further configured to encrypt the second data and to transmit the encrypted second data to the local client.

7. The method of claim 1, wherein each selected image is representative of at least one of a word from the string or a character from the string.

8. A non-transitory machine-readable storage medium storing machine-executable instructions which when executed by a machine, cause the machine to perform a method, the method comprising:

encrypting first data representing a user interaction with a Web page presented by a browser application, the first data being encrypted at an application level by a cipher module communicatively coupled to the browser application running at a local client machine;

causing, by a JavaScript module embedded within the browser application, the encrypted first data to be transmitted to a remote server for updating the Web page;

receiving, by the JavaScript module, second data from the remote server representing an update of the Web page in response to the first data;

decrypting the second data by the cipher module at the application level of the local client, wherein at least a portion of the second data is decrypted into a text string;

selecting a plurality of images from an image cache based on the text string, wherein each selected image is representative of a portion of the text string;

arranging the one or more images into an image composition that resembles the text string; and updating the Web page based on the image composition without reloading an entirety of the Web page and without the browser application rendering the text string.

9. The non-transitory machine-readable storage medium of claim 8, wherein the JavaScript module is an AJAX (asynchronous JavaScript XML) module, and wherein the encrypted first data is transmitted to the remote server via an XMLHTTPRequest compatible request.

10. The non-transitory machine-readable storage medium of claim 8 wherein the first data is decrypted by a corresponding JavaScript module running within the remote server, and wherein the second data is encrypted by the corresponding JavaScript module of the remote server.

11. The non-transitory machine-readable storage medium of claim 10, wherein the first data and second data are encrypted and decrypted using a key negotiated between the JavaScript module and the corresponding JavaScript module of the remote server, and wherein the key is stored at a location of a volatile memory other than a cookie associated with the browser application.

12. The non-transitory machine-readable storage medium of claim 10, wherein the remote server is a proxy server, wherein in response to the encrypted first data received from the local client, the proxy server is configured to decrypt the first data and to transmit the decrypted first data to a destination Web server that hosts the Web page.

13. The non-transitory machine-readable storage medium of claim 12, wherein, in response to the second data from the destination Web server in response to the first data, the proxy server is further configured to encrypt the second data and to transmit the encrypted second data to the local client.

14. A computer-implemented method, comprising:

decrypting, by a cipher unit of a proxy server, first data received from a client over a network, the first data representing a user interaction with a Web page presented at the client by a browser application, wherein first data is encrypted at an application level of the client;

transmitting, by a JavaScript module of the proxy server, the decrypted first data over the network to a remote server that hosts the Web page;

encrypting, by the cipher unit of the proxy server, second data received from the remote server in response to the decrypted first data; and transmitting, by the JavaScript module of the proxy server, the encrypted second data to the client, wherein the client is to decrypt the second data into a text string, select a plurality of images based on the text string, and update the Web page based on the plurality of images without reloading an entirety of the Web page and without the web browser rendering the text string.

15. The method of claim 14, wherein the JavaScript module is an AJAX (asynchronous JavaScript XML) module, and wherein the encrypted first data is received from the client via an XMLHTTPRequest compatible request and transmitted by a corresponding AJAX module of the client.

16. The method of claim 15, wherein the first data and second data are encrypted using a key negotiated by the AJAX module located locally and the corresponding AJAX module of the client, and wherein the key is stored at a location of a volatile memory of the client other than a cookie associated with the browser application.

17. A non-transitory machine-readable storage medium storing machine executable instructions which when executed by a machine, cause the machine to perform a method, the method comprising:

decrypting, by a cipher unit of a proxy server, first data received from a client over a network, the first data representing a user interaction with a Web page presented at the client by a browser application, wherein first data is encrypted at an application level of the client;

transmitting, by a JavaScript module of the proxy server, the decrypted first data over the network to a remote server that hosts the Web page;

encrypting, by the cipher unit of the proxy server, second data received from the remote server in response to the decrypted first data; and transmitting, by the JavaScript module of the proxy server, the encrypted second data to the client, wherein the client is to decrypt the second data into a text string, select a plurality of images based on the text string, and update the Web page based on the plurality of images without reloading an entirety of the Web page and without the web browser rendering the text string.

18. The non-transitory machine-readable storage medium of claim 17, wherein the JavaScript module is an AJAX (asynchronous JavaScript XML) module, and wherein the encrypted first data is received from the client via an XMLHTTPRequest compatible request and transmitted by a corresponding AJAX module of the client.

19. The non-transitory machine-readable storage medium of claim 18, wherein the first data and second data are encrypted using a key negotiated by the AJAX module located locally and the corresponding AJAX module of the client, and wherein the key is stored at a location of a volatile memory of the client other than a cookie associated with the browser application.

20. A system, comprising:
a memory to store instructions for providing security within a web browser; and
a processing device, coupled to the memory, wherein the processing device is configured to:
encrypt first data representing a user interaction with a Web page presented by the web browser, the first data being encrypted at an application level using a cipher module communicatively coupled to the web browser;
cause, using a JavaScript module embedded within the web browser, the encrypted first data to be transmitted to a remote server for updating the Web page;
receive, using the JavaScript module, second data from the remote server representing an update of the Web page in response to the first data;
decrypt, using the cipher module, the second data at the application level, wherein at least a portion of the second data is decrypted into a text string;
select a plurality of images from an image cache based on the text string, wherein each selected image is representative of a portion of the string;
arrange the one or more images into an image composition that resembles the text string; and
update the Web page based on the image composition without reloading an entirety of the Web page and without the browser application rendering the text string.

21. A system, comprising:
a memory to store instructions for a proxy server that includes a cipher unit and a JavaScript module; and
a processing device, coupled to the memory, wherein the processing device is configured to:
decrypt, using the cipher unit, first data received over a network, the first data representing a user interaction with a Web page presented at the client by a browser application, wherein first data is encrypted at an application level of the client; and
transmit, using the JavaScript module, the decrypted first data over the network to a remote server that hosts the Web page, wherein the cipher unit is configured to encrypt second data received from the remote server in response to the decrypted first data, and the JavaScript module is configured to transmit the encrypted second data to the client, wherein the client is to decrypt the second data into a text string, select a plurality of images based on the text string, and update the Web page based on the plurality of images without reloading an entirety of the Web page and without the web browser rendering the text string.

* * * * *